US012331996B2

(12) United States Patent
Delaire et al.

(10) Patent No.: US 12,331,996 B2
(45) Date of Patent: Jun. 17, 2025

(54) MODULAR DEVICE FOR POSITIONING METAL PARTS DURING THERMAL TREATMENT OPERATIONS

(71) Applicant: BODYCOTE, Saint Priest (FR)

(72) Inventors: Vincent Delaire, Thiers (FR); Laurent Gardien, Dolomieu (FR)

(73) Assignee: BODYCOTE, Saint Priest (FR)

(*) Notice: Subject to any disclaimer, the term of this patent is extended or adjusted under 35 U.S.C. 154(b) by 109 days.

(21) Appl. No.: 17/630,834

(22) PCT Filed: Jul. 23, 2020

(86) PCT No.: PCT/EP2020/070836
§ 371 (c)(1),
(2) Date: Jan. 27, 2022

(87) PCT Pub. No.: WO2021/018734
PCT Pub. Date: Feb. 4, 2021

(65) Prior Publication Data

US 2022/0276005 A1 Sep. 1, 2022

(30) Foreign Application Priority Data

Jul. 30, 2019 (FR) ....................................... 1908685

(51) Int. Cl.
*F27D 5/00* (2006.01)
*C21D 9/00* (2006.01)

(52) U.S. Cl.
CPC ........... *F27D 5/005* (2013.01); *C21D 9/0025* (2013.01); *F27D 5/0018* (2013.01); *F27D 2005/0081* (2013.01)

(58) Field of Classification Search
CPC ............... H01L 21/0274; H01L 21/027; H01L 21/67225; G03F 7/0035; G03F 7/11;
(Continued)

(56) References Cited

U.S. PATENT DOCUMENTS 2,287,740 A * 6/1942 Klouman .................. F27D 3/12 248/176.2
3,992,139 A * 11/1976 Lovatt ................... F27D 5/0006 34/239
(Continued)

FOREIGN PATENT DOCUMENTS

CN 202793013 3/2013
CN 202793013 U * 3/2013
(Continued)

OTHER PUBLICATIONS

Project Source 18-in D×36-in W×72-in H 5-Tier Steel Utility in the Freestanding Shelving Units department at Lowes.com. Available Jul. 20, 2021. (Year: 2021).*
(Continued)

*Primary Examiner* — Keith D. Hendricks
*Assistant Examiner* — Moriah S. Smoot
(74) *Attorney, Agent, or Firm* — NIXON & VANDERHYE

(57) ABSTRACT

Disclosed is a tool system for disposing parts therein that are intended to undergo a thermal treatment, including a plurality of elementary components which can be assembled together, each component being made of a material suitable for its function, in particular blocks made of graphite and beams made of composite material.

19 Claims, 3 Drawing Sheets

(58) Field of Classification Search
CPC .......... G03F 7/168; G03F 7/0042; G03F 7/40; G03F 7/162; G03F 7/70033; F27D 5/005; F27D 5/0018; F27D 2005/0081; F27D 5/0006; F27D 5/00; C21D 9/0025; C21D 9/0068; C21D 9/40; C23C 8/00
See application file for complete search history.

(56) References Cited

U.S. PATENT DOCUMENTS

| | | | | | |
|---|---|---|---|---|---|
| 4,813,554 | A * | 3/1989 | Pierce, Jr. | F27D 5/0006 211/188 |
| 6,401,941 | B1 * | 6/2002 | Maumus | A47F 5/0815 211/13.1 |
| 8,298,474 | B2 * | 10/2012 | Kuhn | F27B 9/16 414/626 |
| 8,708,295 | B2 * | 4/2014 | Barthelmie | F27D 5/0006 248/346.02 |
| 8,784,098 | B2 * | 7/2014 | Komiyama | F27D 5/0006 432/261 |
| 2018/0283791 | A1 * | 10/2018 | Pfeffer | F27D 5/0031 |

FOREIGN PATENT DOCUMENTS

| | | | | | |
|---|---|---|---|---|---|
| CN | 104634113 | B * | 1/2019 | |
| FR | 2 793 311 | | 11/2000 | |
| KR | 10-1527158 | | 6/2015 | |
| KR | 101527158 | B1 * | 6/2015 | |
| KR | 10191252 | B1 * | 10/2018 | |
| WO | 2015/122912 | | 8/2015 | |
| WO | WO-2015122912 | A1 * | 8/2015 | B29C 70/16 |

OTHER PUBLICATIONS

Fairham, William. Woodwork Joints: How They Are Set Out, How Made and Where Used. Good Press, 2007. http://www.jmbh.org/Dremel/DIY%20Books/Woodwork%20Joints.pdf (Year: 2007).*
Harley, Chip. Build a Craftsman-style Pergola. Fine Homebuilding, 2006. https://www.finehomebuilding.com/pdf/021178042.pdf (Year: 2006).*
International Search Report for PCT/EP2020/070836 dated Sep. 10, 2020, 7 pages.
Written Opinion of the ISA for PCT/EP2020/070836 dated Sep. 10, 2020, 6 pages.

* cited by examiner

[Fig. 1]
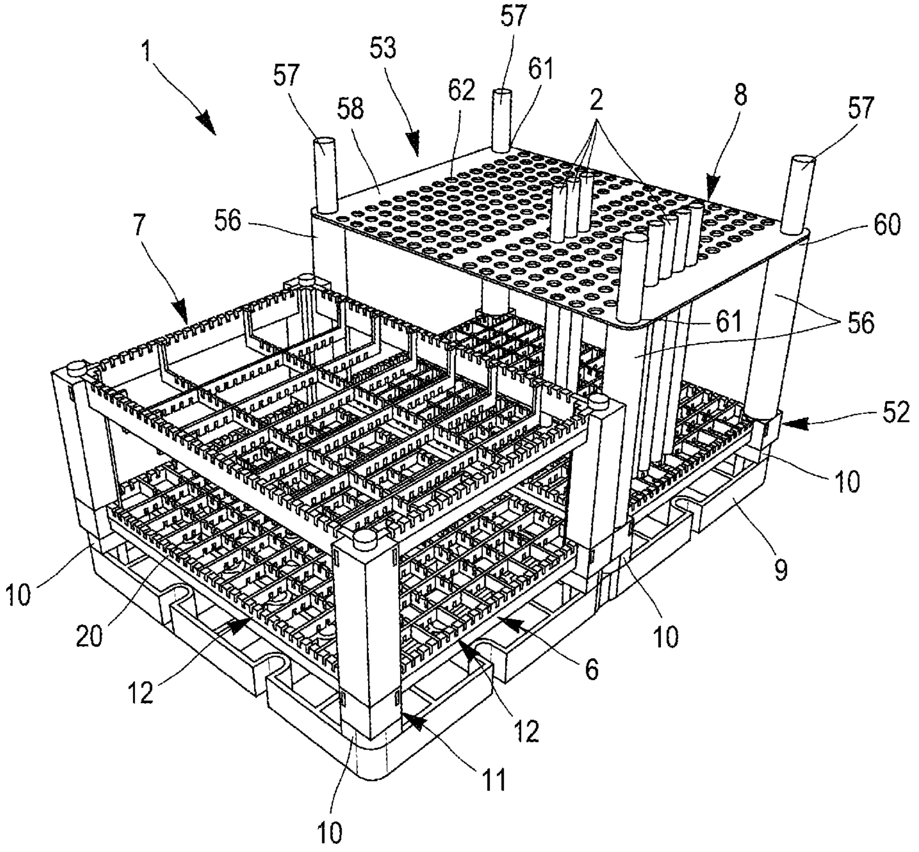

[Fig. 2]
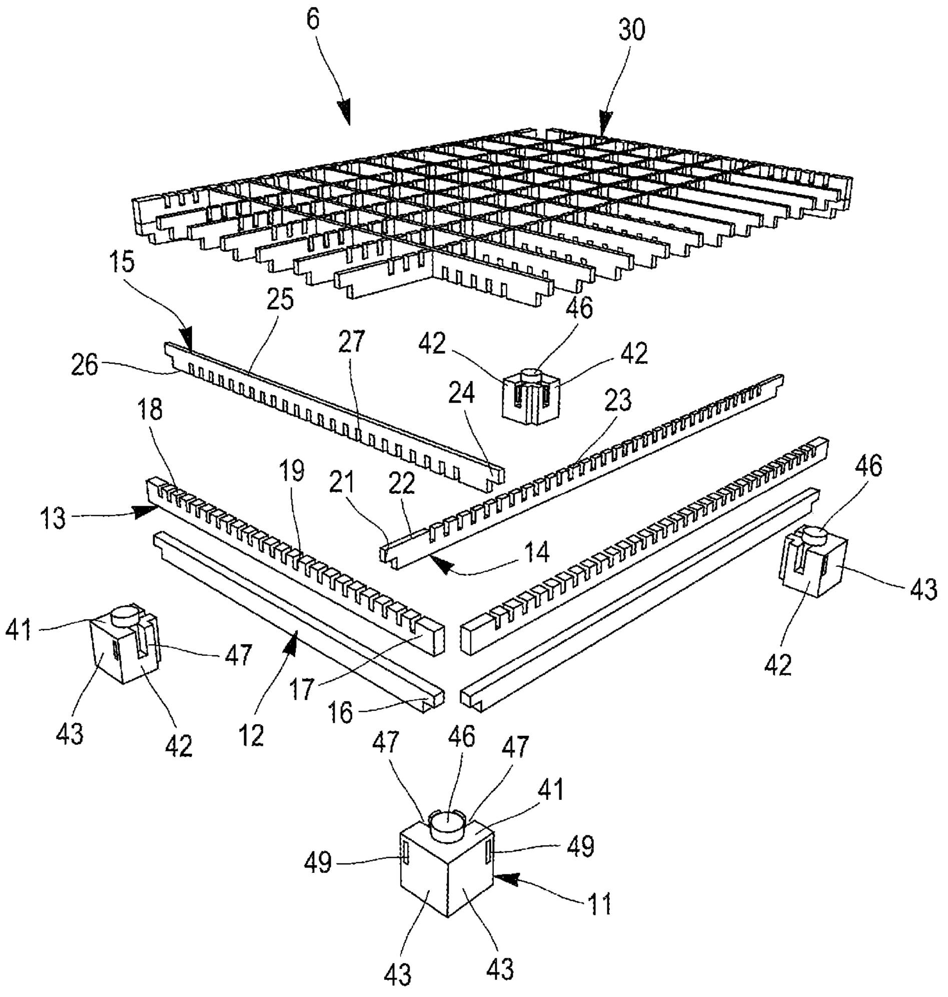

[Fig. 3]
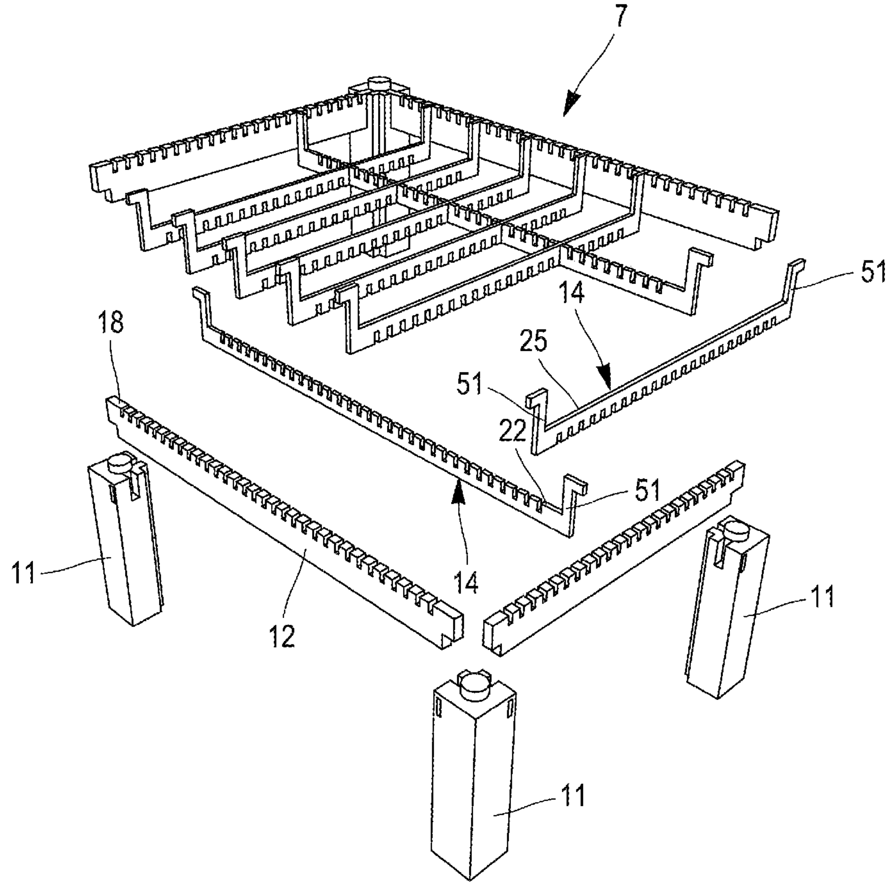

MODULAR DEVICE FOR POSITIONING METAL PARTS DURING THERMAL TREATMENT OPERATIONS

CROSS-REFERENCE TO RELATED APPLICATIONS

This application is the U.S. national phase of International Application No. PCT/EP2020/070836 filed Jul. 23, 2020 which designated the U.S. and claims priority to French Patent Application No. 1908685 filed Jul. 30, 2019, the entire contents of each of which are hereby incorporated by reference.

BACKGROUND OF THE INVENTION

Field of the Invention

The present invention relates to the field of the heat treatment of parts. More specifically, the present invention relates to the field of tools used for arranging the parts throughout the treatment.

Description of the Related Art

The heat treatment operations use numerous tools or assemblies for positioning the parts to be treated and holding same during the various steps. In order to limit the geometric deformations of the parts, at high temperature, the design of said tools must take into account:

- the specificities of the parts to be treated (shape, mass, material);
- the treatment parameters to be applied (temperature, time, atmosphere, cooling media, pressure, etc.);
- the positioning of the parts (installed, suspended, etc.);
- various optimisation criteria:
  - Filling rate, that is to say the quantity of parts, the volume and the weight of the load;
  - Treatment conditions such as the circulation of gases or of oil during the “quenching” and the enrichment homogeneity during thermochemical treatments.

The tools may be of numerous types, for example:

- perforated plates;
- baskets; or,
- suspended supports.

The tools may be made of various materials. The materials mainly used are “refractory” steels, highly alloyed and having improved creep resistances. More rarely, CFC (acronym for “Carbon Fibre Composite”, carbon fibre composites bound in a carbon matrix), graphite or ceramics are notably used.

Although steel tools are widespread, they have numerous disadvantages. They are heavy and they have significant conductivity and specific heat. This limits the performances during cooling phases because a significant amount of heat needs to be removed. For the same reasons, they have a high inertia during heating phases, which increases the treatment times, therefore the energy consumptions. Furthermore, due to the creep at high temperature, the steel tools are rapidly deformed, which often results in nonconformities on the parts treated and the frequent replacement of said equipment, which is a source of significant costs.

The production of the same tools in other materials such as CFC, graphite or ceramics is particularly expensive. Notably, it is not very suitable for small production series, for which a specific tool cannot be amortised.

SUMMARY OF THE INVENTION

The aim of the invention is to propose a tool that integrates all of the data and constraints disclosed previously and that, furthermore:

- has an improved durability, that is to say an improvement in the “service life” thereof, therefore of the number of parts produced in satisfactory conditions with a same tool;
- makes it possible to reduce the tool cost, brought to the part produced;
- may be adaptable and/or reusable.

In order to solve said problem, the invention proposes a modular tool system for the heat treatment of parts that includes a plurality of elementary components that can be assembled with one another, each component being made of a material suitable for the function thereof and the system comprising at least two components, each made of a different material. It may include vertical load transfer elements and horizontal load transfer elements. The vertical load transfer elements are advantageously made of graphite. The horizontal load transfer elements are advantageously made of a composite material, preferably having a carbon or ceramic matrix.

Preferably, the vertical load transfer elements are studs and the horizontal load transfer elements are beams intended to be assembled with the studs such as to form a frame.

Preferably, the vertical load transfer elements are columns and the horizontal load transfer element is a plate intended to rest on the columns, said plate preferably being made of a ceramic composite and agglomerated fibres.

The system may include, among the elements, at least one element made of quartz.

The system may include means for positioning a first element relative to a second element among a plurality of possible positions. It may also include means for mutually assembling and disassembling the elements.

BRIEF DESCRIPTION OF THE DRAWINGS

A plurality of modes of implementation of the invention will be described hereafter, by way of non-limiting examples, with reference to the appended drawings wherein:

FIG. 1 is a perspective view of a tool system for the heat treatment of parts;

FIG. 2 is an exploded and perspective view of a first portion of the system in FIG. 1; and, FIG. 3 is an exploded and perspective view of a second portion of the system in FIG. 1.

DESCRIPTION OF THE PREFERRED EMBODIMENTS

The terms above, below, horizontal, vertical, upper, lower, notably, must be understood in the position of use in FIG. 1, they are not limiting.

FIG. 1 illustrates a tool system 1 according to the invention for the heat treatment of parts. In FIG. 1, only the parts 2 in the form of cylinder-shaped bars 2 are shown. According to the tools used, other types of parts may be treated with the system. The system 1 uses a plurality of modular tools 6, 7, 8 that are provided for making it possible to hold the parts in a furnace during the heat treatment thereof.

In the example illustrated, the tools 6, 7, 8 are mounted on a base 9 of a type suitable for attaching thereto tools and for being used in a heat treatment furnace working continuously, known as "batch" furnace, or semi-continuously, known as "pusher" furnace, for example a cementation furnace.

A first tool 6 is shown in FIG. 1, with other tools 7, 8, mounted on the base 9. It is shown in isolation and partially exploded in FIG. 2. It has a substantially rectangular, horizontal platform shape. It comprises:

four studs 11;

four beams 12;

four interfaces 13;

primary cross members 14; and, secondary cross members 15.

In the example illustrated, the four studs 11 are mutually identical. They are connected at the base 9 using adapters 10.

The beams 12 form two pairs of mutually identical beams; one pair of short beams and one pair of long beams. Each end 16 of each beam 12 is attached to a respective stud 11, so that the studs 11 and the beams 12 together form a frame 20 which, seen from above, has a substantially rectangular shape.

The interfaces are of the positioner type. Said positioners 13 form two pairs of mutually identical positioners; one pair of short positioners and one pair of long positioners.

In the example illustrated, each positioner 13 has a bar shape of rectangular section. It is installed on a respective beam 12, a short positioner on a short beam and a long positioner on a long beam. Each of the ends 17 of the positioner is engaged with the same stud 11 as the corresponding end of the beam. It comprises a serrated upper edge 18 wherein are formed notches 19.

Each primary cross member 14 rests on two of the positioners 13 of a same pair, arranged facing one another, so that the primary cross members are mutually parallel. Each end 21 of a primary cross member rests within a notch 19 of a respective positioner among the two facing one another. In the example illustrated, the primary cross members are long cross members, which rest on a pair of short positioners.

The primary cross members include a serrated upper edge 22 wherein are formed notches 23.

Each secondary cross member 15 rests on two of the primary cross members 14 of a same pair, arranged facing one another, so that the secondary cross members are mutually parallel. Each end 24 of a secondary cross member 15 rests within a notch 23 of a respective primary cross member among the two facing one another. In the example illustrated, the secondary cross members are short cross members.

The secondary cross members 15 include a smooth upper edge 25 and a serrated lower edge 26 wherein are formed notches 27.

The notches 27 of the secondary cross members and the notches 23 of the primary cross members are designed in order to slot together so that, when the secondary cross members rest on the primary cross members, the upper edges 22, 25 of the primary and secondary cross members are coplanar. Thus, the primary and secondary cross members 14, 15 together form a grating 30 that is supported by the frame 20.

Furthermore, in the example illustrated of the first tool 6, the notches 19 of the positioners 13 and the ends of the cross members 14, 15 are designed in order to mutually interlock so that, when the ends of the cross members rest on the positioners, as illustrated in FIG. 1, the upper edges 22, 25 of the cross members are coplanar with the upper edges 18 of the positioners 13.

The ends of the beams and of the cross members have a shoulder shape that enables same to have a sufficient height whilst making it possible to hold the upper edges 18, 22 and 25 coplanar.

The studs 11 are mutually identical. Each stud is of substantially parallelepiped shape; in the example illustrated of the first tool 6, the studs are substantially cubic, that is to say that it has six faces 41-43 substantially square. It comprises:

a horizontal upper face 41 from the centre of which rises a cylinder-shaped pin 46;

a lower face, not visible in the figures, at the centre of which is formed a bore provided for receiving a pin of another stud, so that two studs may be stacked held mutually horizontal;

two vertical, inner faces 42 mutually forming a right angle; and, two vertical, outer faces 43 forming together a right angle.

Each stud 11 comprises two vertical grooves 47, each on a respective inner face 42. Each groove is open in the respective face thereof and open in the upper face 41. This makes it possible to insert the respective ends of the beam and of the positioner.

There may be more vertical grooves 47 than the two illustrated in said example; they may not be open upwardly.

Each stud 11 further comprises two lateral slots 49, each opening on one hand into an outer face 43 and on the other hand into a respective groove 47. Each slot is provided in order to insert therein a key, not shown, in order to hold the studs rigidly connected to the beams and, possibly, to the positioners.

There may be more slots than the two slots illustrated in said example.

In the example illustrated, the positioners are not attached to the frame 20 formed by the studs and the beams, so that they may be installed or removed easily, for example in order to use another type of interface or in case of excessive wear.

Preferably, in the position of use in FIG. 1, the level of the upper face 41 is higher than the level of the upper edge 18 of the positioner, so that two studs can be superimposed. In the example illustrated, the upper edge 18 of the positioner is flush with the upper face 41.

The various notches, distributed on the positioners 13, and the cross members 14, 15, make it possible to choose the spacing and the number of cross members of each type 14, 15 that it is desired to use, according to the parts to be treated, the number thereof, the weight thereof and the dimensions thereof.

The materials chosen for each of the elementary components 11-15 of the tool 6 are chosen according to the constraints that same must undergo, as much due to the holding and the weight of the parts to be treated as to the heat treatment undergone.

Preferably, in the example illustrated:

the studs 11 are made of isostatic graphite;

the beams 12 are made of CFC or of ceramic fibre and matrix composite; and, the interfaces 13 are made of CFC or metal.

Thanks to the use of materials specific to the function of each elementary component, the weight of the tools, therefore, notably the cost thereof and the thermal inertia thereof is reduced.

The second tool 7 will now be described in that it differs from the first tool 6.

FIG. 3 is a partially exploded view of the second tool 7. In said example, the positioner consists of a single part with the beam 12.

Furthermore, the cross members have a "U" shape. The ends thereof comprise a vertical upright 51 that rises above the upper edge 22, 25 thereof. Thus, in the position of use in FIG. 1, the upper edges 18 of the beams 12 are above the coplanar, upper edges 22, 25 of the cross members 14, 15. The second tool has the form of a basket.

The studs 11 have a height greater than same of the studs 11 of the first tool, so that it makes it possible to absorb the depth of the basket, without obstructing the parts that are provided in order to be installed on the first tool.

In order to reduce the number of elementary components, a single type of studs having a single height can also be used. One or more frames 20 may therefore be inserted and stacked between two tools, in order to raise one of the tools relative to the other.

The third tool 8 will now be described with reference to FIG. 1.

In the example illustrated, the third tool is used for treating cylinder-shaped parts 2, arranged vertically in order to limit the deformations thereof during the heat treatment that they must undergo.

The third tool 8 comprises a first portion 52 consisting of a platform of a similar type to same of the first tool 6, on which rests the base of the parts 2. It also comprises a second portion 53, for holding the upper portion of the parts 2.

The second portion 53 comprises:

tubular columns 56;

cylinder-shaped cores 57; and, a retaining plate 58.

Each of the columns 56 is engaged with a pin 46 of a respective stud 11 and that extends vertically upwards from the upper face 41 of said stud. A core 57 is adjusted in each of the columns 56 and extends above the pin 46 within the column. The dimensions of the core are such that it protrudes from the upper end 60 of the column and may be used to interlock therewith an additional column.

The plate is substantially rectangular. It comprises, at each angle, a hole 61 provided for interlocking therewith a core. In this way, the plate is held horizontally by the cores 57 that pass through the holes 61; it is also held vertically by the columns on the ends 60 of which it rests.

The plate is regularly drilled with circular passages 62. Each part 2 passes through a respective passage 62, which thus holds the head of the part.

A second plate of a same type may be provided, preferably between the first portion 52 and the first plate 58, such as to make sure that the parts will remain effectively vertical.

Still in order to optimise the use of each of the constituent elements of the tools, in the example illustrated, the columns are made of graphite and the plate is made of CFC or ceramic fibres in a ceramic matrix.

Of course, the invention is not limited to the examples that have just been described. On the contrary, the invention is defined by the following claims.

Indeed, it will become apparent to the person skilled in the art that various modifications may be made to the embodiments described above, in light of the information that has just been disclosed thereto.

The dimensions of the various components may vary, notably according to the dimensions of the parts to be treated or to the constitution of the load, for example the number of superimposed levels. For example, the studs may comprise more than two grooves or more than two slots.

Thus, different tools may be invented, comprising different components suitable for the furnace or the chamber wherein the treatment must carried out or even for the type of part to be treated.

Materials other than same previously mentioned may also be used. For example, quartz can be used, for producing rods, intended to suspend thereon the parts, or thread thereon annular parts.

The interfaces, more sensitive to wear and erosion, may also be made of quartz.

A modular tool system according to the invention has an improved durability, thus making it possible to increase the number of parts produced in satisfactory conditions, thus a reduction of the cost of tools with the part produced.

A modular tool system according to the invention, based on "standardised" elementary components makes it possible to produce multiple combinations, according to the typology of the parts to be treated and the technical requirements to be met. It makes it possible, on the base of the "elementary" components to produce sub-assemblies suitable for each case.

Thus, the advantages of a system according to the invention are notably:

- the association of "elementary" components that may be combined according to the requirements, making a very wide variety of combinations possible;
- easily replaceable elements, because dismountable, notably in the event of breakage, of a portion of a tool, only same needs to be replaced which represents a significant saving;
- interfaces may make it possible to adapt, to a certain extent, the tool for treating the parts, for example using predefined positions, for example with the notches previously described;
- the same principle can be used for various sizes of treatment furnaces, with numerous elementary components being shared, and it is possible to develop the system with the size of the furnaces;
- It makes it possible to combine various materials according to the properties sought, notably:
  - metals, refractory or not;
  - CFC, with or without impregnation;
  - graphite;
  - ceramics, solid or in the form of plates with agglomerated fibres;
  - quartz; or,
  - other materials.

For equivalent tools, the use of a modular system according to the invention enables a weight reduction that may reach 90% and a usage cost that may be reduced by 50%.

The invention claimed is:

1. A reusable modular system to position and hold metal parts in a heat treatment furnace during heat treatment thereof, the modular system comprising:

a plurality of components that can be assembled with one another, each component being made of a material suitable for heat treatment of parts, the components comprising studs arranged as vertical load transfer elements and beams arranged as horizontal load transfer elements, each stud having a top end presenting an upper face and an opposite, bottom end, each stud having a first side presenting a first inner face extending between the top end and the bottom end and an adjacent second side presenting a second inner face extending between the top end and the bottom end, the first side comprising a first vertical groove open to the first inner face and to the upper face, the second side comprising a second vertical groove open to the second inner face and to the upper face, each beam having a first end and an opposite, second end, the studs and beams being made of different materials, wherein the beams, when assembled with said studs, form a frame, wherein, the first vertical groove of a first one of the studs engages the first end of a first one of the beams and the second vertical groove of the first one of the studs engages the first end of a second one of the beams, the first vertical groove of a second one of the studs engages the second end of the first one of the beams and the second vertical groove of the second one of the studs engages the first end of a third one of the beams, the first vertical groove of a third one of the studs engages the second end of the third one of the beams and the second vertical groove of the third one of the studs engages the first end of a fourth one of the beams, and the first vertical groove of a fourth one of the studs engages the second end of the fourth one of the beams and the second vertical groove of the fourth one of the studs engages the second end of the second one of the beams; and positioners installed on, and extending along on top of, each of the beams, the positioners each being a bar of rectangular section, each positioner having a serrated upper edge and notches formed in the serrated upper edge, each positioner having a first end and an opposite, second end, wherein, the first vertical groove of the first one of the studs engages the first end of a first one of the positioners and the second vertical groove of the first one of the studs engages the first end of a second one of the positioners, the first vertical groove of a second one of the studs engages the second end of the first one of the positioners and the second vertical groove of the second one of the studs engages the first end of a third one of the positioners, the first vertical groove of a third one of the studs engages the second end of the third one of the positioners and the second vertical groove of the third one of the studs engages the first end of a fourth one of the positioners, and the first vertical groove of a fourth one of the studs engages the second end of the fourth one of the positioners and the second vertical groove of the fourth one of the studs engages the second end of the second one of the positioners.

2. The modular system according to claim 1, wherein the studs are made of graphite and the beams are made of a composite material.

3. The modular system according to claim 1, wherein the studs are made of graphite.

4. The modular system according to claim 1, wherein the beams are made of a composite material.

5. The modular system according to claim 1, wherein an end of each of the beams and the positioners are engaged by being inserted into the first and second vertical groove of each stud.

6. The modular system according to claim 2, further comprising:

columns arranged as further vertical load transfer elements and a plate arranged as a further horizontal load transfer element, the plate resting on the columns.

7. The modular system according to claim 1, wherein the positioners are made of quartz.

8. The modular system according to claim 1, wherein said studs, beams, and positioners are intended to be assembled and disassembled with respect to each other.

9. The modular system according to claim 1, wherein the beams are made of a composite material having a carbon or ceramic matrix.

10. The modular system according to claim 6, wherein the plate comprises a ceramic composite and agglomerated fibers.

11. The modular system according to claim 5, wherein the beams are made of a composite material.

12. The modular system according to claim 3, further comprising:

columns arranged as further vertical load transfer elements and a plate arranged as a further horizontal load transfer element, the plate resting on the columns.

13. The modular system according to claim 4, further comprising:

columns arranged as further vertical load transfer elements and a plate arranged as a further horizontal load transfer element, the plate resting on the columns.

14. The modular system according to claim 2, wherein the positioners are made of quartz.

15. The modular system according to claim 3, wherein the positioners are made of quartz.

16. The modular system according to claim 4, wherein the positioners are made of quartz.

17. The modular system according to claim 5, wherein the positioners are made of quartz.

18. A reusable modular system to position and hold metal parts in a heat treatment furnace during heat treatment thereof, the modular system comprising:

a plurality of components that can be assembled with one another, each component being made of a material suitable for heat treatment of parts, the components comprising studs arranged as vertical load transfer elements and beams arranged as horizontal load transfer elements, each stud having a top end presenting an upper face and an opposite, bottom end, each stud having a first side presenting a first inner face extending between the top end and the bottom end and an adjacent second side presenting a second inner face extending between the top end and the bottom end, the first side comprising a first vertical groove open to the first inner face and to the upper face, the second side comprising a second vertical groove open to the second inner face and to the upper face, each beam having a first end and an opposite, second end, the studs and beams being made of different materials, wherein the beams, when assembled with said studs, form a frame, wherein, the first vertical groove of a first one of the studs engages the first end of a first one of the beams and the second vertical groove of the first one of the studs engages the first end of a second one of the beams, the first vertical groove of a second one of the studs engages the second end of the first one of the beams and the second vertical groove of the second one of the studs engages the first end of a third one of the beams, the first vertical groove of a third one of the studs engages the second end of the third one of the beams and the second vertical groove of the third one of the studs engages the first end of a fourth one of the beams, and the first vertical groove of a fourth one of the studs engages the second end of the fourth one of the beams and the second vertical groove of the fourth one of the studs engages the second end of the second one of the beams; and positioners installed on, and extending along on top of, each of the beams, the positioners each being a bar of rectangular section, each positioner having a serrated upper edge and notches formed in the serrated upper edge, each positioner having a first end and an opposite, second end, wherein, the first vertical groove of the first one of the studs engages the first end of a first one of the positioners and the second vertical groove of the first one of the studs engages the first end of a second one of the positioners, the first vertical groove of a second one of the studs engages the second end of the first one of the positioners and the second vertical groove of the second one of the studs engages the first end of a third one of the positioners, the first vertical groove of a third one of the studs engages the second end of the third one of the positioners and the second vertical groove of the third one of the studs engages the first end of a fourth one of the positioners, and the first vertical groove of a fourth one of the studs engages the second end of the fourth one of the positioners and the second vertical groove of the fourth one of the studs engages the second end of the second one of the positioners, wherein the studs are made of graphite, and wherein the beams are made of a composite material having a carbon or ceramic matrix.

19. The modular system according to claim 18, further comprising:

columns arranged as further vertical load transfer elements and a plate arranged as a further horizontal load transfer element, the plate resting on the columns, wherein the plate comprises a ceramic composite and agglomerated fibers.

* * * * *